(12) United States Patent
Baumann et al.

(10) Patent No.: US 6,723,298 B1
(45) Date of Patent: Apr. 20, 2004

(54) METHOD FOR CATALYTIC CONVERSION OF CARBON MONOXIDE IN A HYDROGEN-CONTAINING GAS MIXTURE

(75) Inventors: Frank Baumann, Alzenau (DE); Stefan Wieland, Offenbach (DE)

(73) Assignee: DMC2 Degussa Metals Catalysts Cerdec AG, Frankfurt Am Main 1 (DE)

( * ) Notice: Subject to any disclaimer, the term of this patent is extended or adjusted under 35 U.S.C. 154(b) by 0 days.

(21) Appl. No.: 09/568,814

(22) Filed: May 11, 2000

(30) Foreign Application Priority Data

Mar. 21, 2000  (DE) ......................... 100 13 895

(51) Int. Cl.⁷ ..................... C01B 3/16; C01B 31/20
(52) U.S. Cl. .................. 423/437.2; 423/655; 423/656
(58) Field of Search ................... 423/655, 656, 423/648.1, 650, 651, 652, 437.2

(56) References Cited

U.S. PATENT DOCUMENTS

| | | | |
|---|---|---|---|
| 4,283,308 A | | 8/1981 | Ohara et al. |
| 4,708,946 A | | 11/1987 | Ohata et al. |
| 5,030,440 A | * | 7/1991 | Lywood et al. ............. 423/655 |
| 5,877,377 A | * | 3/1999 | Golunski et al. ........... 423/656 |
| 6,254,807 B1 | * | 7/2001 | Schmidt et al. ............. 423/655 |

FOREIGN PATENT DOCUMENTS

| | | |
|---|---|---|
| DE | OS 1 642 909 | 5/1971 |
| DE | 24 53 784 A1 | 5/1975 |
| DE | 689 05 891 T2 | 4/1990 |
| DE | 693 26 820 T2 | 6/1994 |
| DE | 43 03 715 A1 | 8/1994 |
| EP | 1 161 991 A | 12/2001 |
| FR | 2 567 866 | 7/1984 |
| WO | WO 98/08871 A | 5/1998 |
| WO | WO 99/35082 | 7/1999 |
| WO | WO 99/36351 | 7/1999 |
| WO | WO 00/66486 | 9/2000 |

OTHER PUBLICATIONS

F. Boccizzi et al., "FTIR Study of the Low-Temperature Water-Gas Shift Reaction on Au/Fe2O3 and Au/TiO2 Catalysts", Journal of Catalysis, Bd. 188, 1999, Seiten 176-185, XP-002199864. (No month).

D.C. Grenoble et al., "The Chemistry and Catalysis of the Water Gas Shift Reatcion 1., Kinetics over Supported Metal Catalysts," Journal of Catalysis, Bd. 67, Nr. 1, 1981, Seiten 90-102, XP-001071022. (No month).

European Search Report, OMG AG & Co. KG, Jul. 8, 2002.

German Office Action dated Dec., 13, 2000, corresponding to the German (priority) patent application No. 100 13 895.0.

Translation of above-referenced German Office Action with attached verification of translation.

Ertl G Knozinger H., Weitkamp J., "Handbook of Heterogeneous Catalysis, vol. 4" 1997 VCH Verlagsgesellschaft, Weinheim, Germany, XP-002200710. (No month).

B.J. Whittington et al., "Vehicle Exhaust Catalysis: 1." The relative importance of Catalytic Oxidation, steam reforming and water-gas shift reactions, Catalysis Today, Bd. 26, 1995, Seiten 41-45, XP-002198479. (No month).

* cited by examiner

Primary Examiner—Wayne A. Langel
(74) Attorney, Agent, or Firm—Kalow & Springut LLP

(57) ABSTRACT

A method for catalytic conversion of carbon monoxide with water to carbon dioxide and water in a hydrogen-containing gas mixture (carbon monoxide conversion) by passing the gas mixture over a shift catalyst that is at an operating temperature for the carbon monoxide conversion. The method is carried out with a shift catalyst based on noble metals that is applied to an inert support element in the form of a coating.

9 Claims, No Drawings

METHOD FOR CATALYTIC CONVERSION OF CARBON MONOXIDE IN A HYDROGEN-CONTAINING GAS MIXTURE

INTRODUCTION AND BACKGROUND

The present invention relates to a method for catalytic conversion of carbon monoxide with water to carbon dioxide and hydrogen in a gas mixture that contains hydrogen and other oxidizable components.

The conversion of carbon monoxide with water to carbon dioxide and hydrogen in the presence of catalysts is a known method for producing hydrogen-rich gas mixtures, which is based on the following exothermic reaction:

$$CO + H_2O \leftrightarrows H_2 + CO_2 \quad \Delta H > 0 \quad (1)$$

Here the following side reactions can occur:

CO methanation: $CO + 3H_2 \leftrightarrows CH_4 + H_2O \quad \Delta H > 0$ (2)

and $CO_2$ methanation: $CO_2 + 4H_2 \leftrightarrows CH_4 + H_2O \quad \Delta H > 0$ (3)

The reaction in accordance with reaction equation (1) is called carbon monoxide conversion or CO conversion herein. The term "water gas shift reaction" is commonly used for this in the USA.

The production of hydrogen-rich gas mixtures from hydrocarbons, or alcohols, by steam reforming, partial oxidation or autothermic reforming is a known process. These gas mixtures (reformates) contain 1 to 40 vol % carbon monoxide, depending on the method that is used.

To use the reformate as fuel in fuel cells, it is necessary to reduce the carbon monoxide contained in them as far as possible, in order to avoid poisoning of the platinum-containing anode catalyst of the fuel cell in the oxidation of the hydrogen. In addition, the conversion of carbon monoxide in accordance with reaction equation (1) leads to an increase of the hydrogen content of the reformate and thus to an improvement of the efficiency of the overall process.

For reasons of size and weight catalysts for conversion of carbon monoxide with very high activity and selectivity are required for use in motor vehicles. The high space-time yields that can be achieved by this allow the volume of the reactors that are required to be kept small.

The known catalysts for the conversion of carbon monoxide have chiefly been developed for stationary industrial applications. The emphasis lay in the production of pure hydrogen, ammonia and other large scale products that are based on the use of synthesis gas mixtures ($CO/H_2$). Catalysts for the conversion of carbon monoxide in accordance with reaction equation (1) are also called shift catalysts herein.

These known catalysts are complete catalysts that contain non-noble metals. They are used in two-stage processes. In the first process stage a so-called high temperature CO conversion (high temperature water-gas shift, HTS) is carried out on Fe/Cr catalysts at temperatures between 360 and 450° C. In the subsequent second stage a low-temperature CO conversion (low temperature water-gas shift, LTS) is undertaken on Cu/ZnO catalysts at temperatures between 200 and 270° C. After the low temperature process stage carbon monoxide concentrations of less than 1 vol % in correspondence with the thermal equilibrium are obtained.

The conventional catalysts for the conversion of carbon monoxide have crucial disadvantages:

The described two stage conduct of the process is necessary because of the properties of these catalysts. While Cu/ZnO-containing catalysts become deactivated above 270° C. because of recrystallization, or sintering, of the copper, the Fe/Cr-containing catalysts that are used in the high temperature range cannot be used at low temperatures because of insufficient activity. If the indicated temperature range of the high temperature catalysts is exceeded, methanation reactions (reaction equations (2) and (3)) can occur, which reduce the selectivity of the high temperature catalyst and because of this lower the overall efficiency of the hydrogen generation system.

Both the known high-temperature and the low-temperature catalysts are bulk catalysts, in which the catalyst material is pressed to form pellets or other molded bodies. Accordingly, they consist entirely of catalytically active mass and are also called complete catalysts. As a rule, they have a very high bulk weight.

The known industrial methods for conversion of carbon monoxide on catalysts according to reaction equation (1) operate at space velocities of the gas mixture between 300 and 3000 $h^{-1}$. These low velocities are not sufficient for use in motor vehicles.

High bulk weights and low space velocities lead to low specific conversion rates $R_{CO}$ for the carbon monoxide, which is understood within the scope of this invention to mean the amount of carbon monoxide $N_{CO}$ converted per weight of the catalyst $m_{cat}$ and reaction time $\Delta t$. The weight of the catalyst here is given in grams, the reaction time in seconds and the amount of carbon monoxide in mol:

$$R_{CO} = \frac{n_{co}}{m_{Cat} \Delta t} \left[ \frac{mol}{g \cdot s} \right] \quad (4)$$

The known Cu/ZnO and Fe/Cr catalysts have to be activated by reduction before they are used. The activated catalysts are sensitive to oxygen. Upon contact with atmospheric oxygen they are reoxidized and deactivated in an exothermic reaction.

In comparison with the just described industrial high temperature and low temperature catalysts based on Fe/Cr or Cu/ZnO, noble metal catalysts for these uses are also known, mainly from the scientific literature.

D. C. Grenoble et al. describe in "The Chemistry and Catalysis of the Water Gas Shift Reaction. 1. The Kinetics over Supported Metal Catalysts," J. Catal. 67 (1980) 90–102, powdered catalysts that contain Cu, Re, Co, Ru, Ni, Pt, Os, Au, Fe, Pd, Rh or Ir as active components and that are deposited on aluminum oxide ($Al_2O_3$) as a support material. The kinetic tests gave a reaction order of about 0.2 for carbon monoxide and about 0.5 for the water that was used.

In "Methanization and Water Gas Shift Reactions over Pt/$CeO_2$," J. Catal. 96 (1985), 285–287, Steinberg et al. observed poor selectivities in view of the carbon monoxide conversion according to reaction equation (1). Accordingly, the product gas mixture contains high proportions of methane.

In "Water gas shift conversion using a feed with a low steam to carbon monoxide ratio and containing sulfur," Catal. Today 30 (1996) 107–118, J. Ross et al. investigate a Pt/$ZrO_2$ catalyst, in addition to Fe/Cr, Cu/ZnO and Co/Cr catalysts. This catalyst shows a carbon monoxide conversion of 50% at 320° C. The Pt/$ZrO_2$ catalyst shows the highest tolerance for sulfur-containing compounds among the tested compounds. It shows a conversion of 25% at 300° C. and a conversion of 70% at 350° C. This corresponds to a specific carbon monoxide conversion rate $R_{CO}$ (300° C.)=7.00×10$^{-6}$ mol/($g_{cat}$·sec), or $R_{CO}$ (350° C.)=1.95×10$^{-5}$ mol/($g_{cat}$·sec).

FR 2567866 A describes a copper- and/or palladium-containing catalyst on a support of $ZnAl_2O_4$ spinel, which is obtained by impregnating the spinel formed into particles with diameters between 0.4 and 0.6 mm with solutions of copper and/or palladium and calcining it. A conversion of 86% is achieved with this catalyst at pressures of 40 bar and a temperature of 250° C. at a very high excess of water ($H_2O/CO=10$).

The powdered catalyst systems that have been investigated in the scientific literature are not suitable for industrial use.

The known complete catalysts in the form of tablets, pellets or irregularly shaped particles are used as so called bulk catalysts. Only unsatisfactory space-time yields are obtained with such catalysts. In addition, the achievable specific conversion rates with these catalysts are low.

Accordingly, an object of the present invention is to provide a method for conversion of carbon monoxide in a hydrogen-containing gas mixture that, under the conditions of mobile use in motor vehicles with their rapidly changing power requirements, a high specific conversion rate for carbon monoxide with good selectivity, has high temperature stability and is insensitive to oxygen in the educt gas mixture.

SUMMARY OF THE INVENTION

This above and other objects of the invention can be achieved by a method for catalytic conversion of carbon monoxide to carbon dioxide and hydrogen (carbon monoxide conversion) in a hydrogen-containing gas mixture. For conversion of the carbon monoxide, the gas mixture is passed over a shift catalyst, which is at the operating temperature for carbon monoxide conversion. The method features a shift catalyst based on noble metals that is applied to an inert carrier in the form of a coating.

The method of the present invention is specifically directed to mobile use in motor vehicles powered by fuel cells in order to effectively removed carbon monoxide from the hydrogen-rich gas mixture that is obtained by steam reforming, partial oxidation or autothermic reforming (hereinafter also called reformate gas) under all conditions of operation of the motor vehicle. The gas mixture can contain up to 40 vol % carbon monoxide, depending on its production.

The mobile use of the method imposes high requirements on its efficiency and dynamics. During the operation of the motor vehicle, the catalysts are loaded with very different space velocities. They vary between a low space velocity at idling and 100,000 h$^{-1}$ at full load.

The method of the invention enables a high efficiency, i.e., a high space-time yield through the application of the catalyst in the form of a coating onto an inert carrier. Such a catalyst is also called a coating catalyst herein. The monolithic honeycomb elements of ceramic or metal with cell densities (number of flow channels per area of cross section) of more than 10 cm$^{-2}$ that are known from auto exhaust treatment are suitable as carrier. However, metal sheet, heat exchanger plates, open-cell ceramic or metal foam elements and irregularly shaped elements formed in each case according to requirements can also be used as carriers. The thickness of the coating can vary between 10 and 100 μm according to application.

A carrier within the scope of this invention is characterized as inert if the material of the carrier does not participate or participates only negligibly in the catalytic conversion. As a rule, these are bodies with low specific surface and low porosity.

A catalyst that contains the elements of the platinum group of metals, thus platinum, palladium, rhodium, iridium, ruthenium and osmium, or gold as the catalytic active components on an oxide support made from the group consisting of aluminum oxide, silicon dioxide, titanium oxide, rare earth oxides or mixed oxides of these or zeolites is suitable for the proposed method. In order to enable distribution of the catalytically active components on the support material that is as fine as possible, the support material should have at least a specific surface (BET surface, measured in accordance with DIN 66132) of more than 10 m$^2$/g.

This noble metal catalyst exhibits a shift activity, i.e., it is capable, if the appropriate reaction conditions exist (temperature, gas composition), of converting carbon monoxide with water in accordance with reaction equation (1) to carbon dioxide and hydrogen. For this reason it is also called a noble metal shift catalyst herein. Its shift activity and selectivity can be improved by the addition of other catalytically active components, or promoters. Among these are elements of the rare earth metals, in particular cerium and lanthanum, as well as the non-noble metals of the subgroups of the periodic system of elements, especially iron or copper.

The shift activity and selectivity can, moreover, also be increased by doping the support material with redox-active oxides of the metals cerium, zirconium, titanium, vanadium, manganese and iron in an amount of 1 to 50 wt % with respect to the total weight of the support material.

A preferred shift catalyst for the method in accordance with the invention contains platinum and/or palladium together with iron or copper as well as cerium oxide on a finely divided aluminum oxide.

The use of the shift catalyst based on noble metals for the method also has the advantage that this catalyst does not become deactivated by contact with oxygen. For this reason no costly measures to protect the catalyst from contact with air are necessary in a motor vehicle.

DETAILED DESCRIPTION OF INVENTION

The present invention will now be described in further detail.

In accordance with the invention, the described catalyst material is not processed to complete catalysts, but rather is applied in the form of a coating to inert supports. In this way the disadvantages of complete catalysts that consist of the catalytically active centers in the interior of the complete catalyst being poorly accessible to the reactants are avoided in this method. Poor accessibility reduces the specific conversion rate for carbon monoxide and thus the achievable space-time yield. This has the corresponding negative effects on the volume of the required reactor. The vibrations caused by operation of the motor vehicle additionally lead to undesired abrasion of complete catalysts, which blocks the flow paths in the catalyst bed and thus continuously increases the pressure difference in the reactor.

The process operates at gas mixture space velocities from idling space velocity up to a value of 100,000 h$^{-1}$ and at a pressure between atmospheric pressure and 10 bar, where the space velocity is given in reference to the volume of carrier coated with the catalyst. The method can be used both for low-temperature CO conversion as well as for high-temperature CO conversion.

A noble metal shift catalyst with an operating temperature between 180 and 300° C. is used for the low-temperature CO conversion. The low operating temperature is achieved through a relatively high charge of catalytically active noble metals on the catalyst. In low-temperature CO conversion the reformate gas usually contains 2 to 15 vol % carbon monoxide and has an input temperature between 100 and 250° C., which results from the reforming process.

A noble metal shift catalyst with an operating temperature between 280 and 550° C. is used for the high temperature CO conversion. In the high temperature CO conversion the reformate gas usually contains 2 to 40 vol % carbon monoxide and has an input temperature between 300 and 600° C., which results from the reforming process.

The method also allows a high temperature conversion stage and a low temperature conversion stage to be connected in succession. The gas mixture in this case leaves the high temperature stage at a temperature that corresponds to the operating temperature of the catalyst of the high temperature stage and for this reason has to be cooled to the operating temperature of the catalyst of the low-temperature stage before contact with it.

There are various possibilities for production of a coating catalyst suitable for the method, a few of which are discussed here.

To produce a shift catalyst on a carrier element in accordance with the invention, the support material for the catalytically active components can be suspended in an aqueous solution of soluble compounds of a noble metal selected from the group consisting of platinum, palladium, rhodium, ruthenium, iridium, osmium, gold and mixtures thereof and other soluble compounds of non-noble metals of the subgroups. Then the acid suspension is neutralized at elevated temperature with a base, for example, a sodium carbonate, and then reduced at the same temperature with an aqueous reducing agent (formaldehyde, hydrazine), filtered, washed, dried, calcined in an oxidizing atmosphere at temperatures between 300 and 550° C., and then reduced at temperatures between 300 and 600° C. The catalyst material is again suspended in water to produce a coating suspension. The carrier element is coated with this suspension. For this, the methods for coating carrier elements that are known from auto exhaust catalysis can be used. To finish the production of the coating catalyst the coating is dried, calcined at temperatures between 300 and 600° C. and reduced in a hydrogen-containing gas at temperatures between 300 and 600° C.

As an alternative to the described method, the carrier element is first coated only with the support material, where the support material can contain rare earth oxides and oxides of non-noble metals of the subgroups. The coating on the carrier element is then impregnated with a solution of at least one soluble noble metal compound, soluble compounds of the rare earths and the non-noble metals of the subgroups. To finish the production of the coating catalyst, the coated carrier element is dried, calcined at temperatures between 300 and 600° C. and reduced in a hydrogen-containing gas at temperatures between 300 and 600° C.

Another variation for making a coating catalyst in accordance with the invention resides in first producing a suspension of the support material, the soluble compounds of the noble metals and optionally the soluble compounds of the non-noble metals of the subgroups and the rare earths. The dissolved components of the suspension are then precipitated onto the suspended support material through the addition of a basic precipitation agent such as sodium hydroxide. The suspension prepared in this way is used directly for coating the carrier element. To finish the production of the coating catalyst, the coated carrier element is dried, calcined at temperatures between 300 and 600° C. and reduced in a hydrogen-containing gas at temperatures between 300 and 600° C.

The invention is illustrated in more detail by means of the following examples.

EXAMPLE 1

A noble metal shift catalyst (catalyst A) was produced as follows:

A ceramic element honeycomb carrier with 93 cells per square centimeter and a volume of 0.041 L was coated with 7.25 g γ-aluminum oxide by immersing it in an aqueous suspension of γ-aluminum oxide (specific surface 140 $m^2/g$) and calcining for 2 h at 600° C. After calcination the coated honeycomb element was impregnated with a solution of $Ce(NO_3)_2 \cdot 6H_2O$ and then calcined for 2 h at 500° C. The calcined molded element was then impregnated with a solution of $Pt(NO_3)2$, $Pd(NO_3)_2$ and $Fe(NO_3)_3$.

The catalytically active coating of the catalyst prepared in this way had a total weight of 5.16 g, which corresponds to 126 g per liter of volume of the honeycomb element. It contained 1.2 wt % Pt, 1.2 wt % Pd, 2.4 wt % Fe, 35.7 wt % $CeO_2$ and 59.5 wt % $Al_2O_3$.

The catalyst was tested under the conditions of a high temperature conversion with a synthetic reformate. Its $CO_2$ selectivity $S_{CO2}$, CO conversion, as well as specific conversion rate $R_{CO}$ in accordance with equation (4) were measured. The following gas composition was used for the high temperature conversion: 27.0 vol % $H_2$, 9.0 vol % CO, 9.0 vol % $CO_2$, 18.0 vol % $H_2O$, 37.0 vol % $N_2$. The catalysts were tested at a gas space velocity GHSV=10,000 $h^{-1}$ and a pressure of 2 bar (absolute).

The $CO_2$ selectivity $S_{CO2}$ of the conversion of carbon monoxide was calculated by means of the partial pressures of the carbon dioxide $p_{CO2}$ and methane $p_{CH4}$ that formed, as $$S_{co_2} = \frac{p_{CO_2}}{p_{CO_2} + p_{CH_4}} \quad (5)$$

TABLE 1

High-Temperature CO conversion on catalyst A

| T [°C.] | $S_{CO_2}$ [%] | CO Conversion [%] | $R_{CO} \left[ \frac{mol}{g \cdot s_{cat}} \right]$ |
|---|---|---|---|
| 300 | 100 | 27 | $3.0 \cdot 10^{-5}$ |
| 350 | 100 | 35 | $4.0 \cdot 10^{-5}$ |
| 400 | 100 | 45 | $4.8 \cdot 10^{-5}$ |

COMPARISON EXAMPLE 1

A commercial Fe/Cr catalyst (catalyst B; tablets 5×5 mm) was tested under the same conditions as catalyst A.

TABLE 2

High-temperature CO conversion on catalyst B

| T [°C.] | $S_{CO_2}$ [%] | CO Conversion [%] | $R_{CO}$ $\left[\dfrac{mol}{g \cdot s_{cat}}\right]$ |
|---|---|---|---|
| 300 | 100 | 30 | $2.2 \cdot 10^{-6}$ |
| 350 | 100 | 37 | $2.7 \cdot 10^{-6}$ |
| 400 | 100 | 45 | $3.3 \cdot 10^{-6}$ |

As Tables 1 and 2 show, both catalysts exhibit comparable CO conversions. However, catalyst A in accordance with the invention shows a tenfold higher specific conversion rate $R_{CO}$ in comparison with catalyst B, because of its higher activity.

Further variations and modifications of the foregoing will be apparent to those skilled in the art and are intended to be encompassed by the claims appended hereto.

German priority application 100 13 895.0 is relied on and incorporated herein by reference.

What is claimed is:

1. A method for the catalytic conversion of carbon monoxide in a hydrogen-containing gas mixture with water to form carbon dioxide and hydrogen comprising passing said gas mixture over a shift catalyst having an operating temperature between 180 and 550° C., said shift catalyst comprising platinum, palladium, iron and cerium oxide on finely divided aluminum oxide and being deposited on an inert support in the form of a coating, wherein said gas mixture contains from 2 to 40 vol-% of carbon monoxide.

2. The method according to claim 1, wherein iron and cerium are present on the aluminum oxide in an amount of 1 to 50 wt.-% with respect to the total weight of the support material.

3. The method according to claim 1, wherein the inert support is a honeycomb element of ceramic or metal, open-cell, ceramic or metallic foam elements, metal sheet, heat exchanger plates or irregularly shaped elements.

4. The method according to claim 3, further comprising passing the gas mixture over the catalyst at a space velocity between an idling space velocity and 100,000 $h^{-1}$ and at a pressure between atmospheric pressure and 10 bar, where the space velocity refers to the volume of the inert support carrier coated with the catalyst.

5. The method according to claim 4, wherein the temperature of the shift catalyst lies between 180 and 300° C.

6. The method according to claim 4, wherein the operating temperature of the shift catalyst lies between 280 and 550° C.

7. The method according to claim 4, wherein the shift catalyst with an operating temperature between 280 and 550° C. is another shift catalyst with an operating temperature between 180 and 300° C. and that the gas mixture is cooled to the operating temperature of the additional catalyst before contact with it.

8. The method according to claim 4, wherein the space velocity ranges between idling space velocity and less than 60,000 $h^{-1}$.

9. The method according to claim 4, wherein the space velocity ranges between idling space velocity and 10,000 $h^{-1}$.

* * * * *